United States Patent [19]

Dobó et al.

[11] Patent Number: 4,756,560
[45] Date of Patent: Jul. 12, 1988

[54] FITTING FOR HOSE PIPES

[76] Inventors: Miklós Dobó, Breitscheider Weg 8, 4030 Ratingen 4; Manfred Peuker-Holtermann, Dresdner Strasse 29, 4020 Mettmann; Ernst Rupprecht, Nordring 36, 5270 Gummersbach 1; Rainer Vetterman, An der Lilie 33, 4030 Ratingen 1, all of Fed. Rep. of Germany

[21] Appl. No.: 920,056

[22] Filed: Oct. 20, 1986

Related U.S. Application Data

[63] Continuation of Ser. No. 519,227, Aug. 2, 1983, abandoned.

[30] Foreign Application Priority Data

Aug. 10, 1982 [DE] Fed. Rep. of Germany ....... 3229691

[51] Int. Cl.⁴ .............................................. F16L 39/02
[52] U.S. Cl. .................................. 285/149; 285/908; 29/157 R
[58] Field of Search ....................... 285/149, 908, 915; 156/294, 293, 91; 228/120, 122, 175

[56] References Cited

U.S. PATENT DOCUMENTS

| | | |
|---|---|---|
| 840,536 | 1/1907 | Weir ................... 285/149 X |
| 2,810,594 | 10/1957 | Walsh et al. ............. 285/908 X |
| 3,068,028 | 12/1962 | Elliott ................ 285/149 |
| 3,467,764 | 9/1969 | Knapp ................. 285/149 X |
| 3,831,635 | 8/1974 | Burton ................ 285/149 X |
| 3,936,118 | 2/1976 | Thiery et al. ........... 285/149 X |
| 4,033,612 | 7/1977 | Chevalier ............. 285/149 |
| 4,063,757 | 12/1977 | Fuhrmann ............. 285/149 |
| 4,187,135 | 2/1980 | Yates ................. 156/294 X |
| 4,530,379 | 7/1985 | Policelli ............. 285/149 |

FOREIGN PATENT DOCUMENTS

| | | | |
|---|---|---|---|
| 204853 | 5/1955 | Australia ................... 285/149 |
| 2260357 | 6/1973 | Fed. Rep. of Germany ...... 285/149 |
| 2541242 | 3/1977 | Fed. Rep. of Germany ...... 285/149 |
| 1458100 | 11/1966 | France ..................... 285/149 |
| 581180 | 10/1946 | United Kingdom ............ 285/149 |
| 677656 | 8/1952 | United Kingdom ............ 285/149 |
| 774528 | 5/1957 | United Kingdom ............ 285/149 |

Primary Examiner—Thomas F. Callaghan
Attorney, Agent, or Firm—Browdy and Neimark

[57] ABSTRACT

A hose fitting for use with high pressure hoses and/or hoses with large diameter with reinforcement layers incorporated into the hose material consists in a metal nipple to which, on the one hand, each reinforcement layer is individually fixed, and which, on the other hand, is connected in seal-tight manner and firmly with the inner and covering layers of the hose. So that the strength of the hose construction in the area of the fitting should not be reduced, and in particular the internal pressure resistance should not be lowered, the nipple has a plurality of concentric shells which are firmly connected with the nipple and are disposed in a radial direction at a distance one from the other, so that radial clearances between adjoining shells are produced. The fixing ends of the reinforcement layers engage into the clearances between the shells, each reinforcement layer being fixed to at least one shell surface.

10 Claims, 1 Drawing Sheet

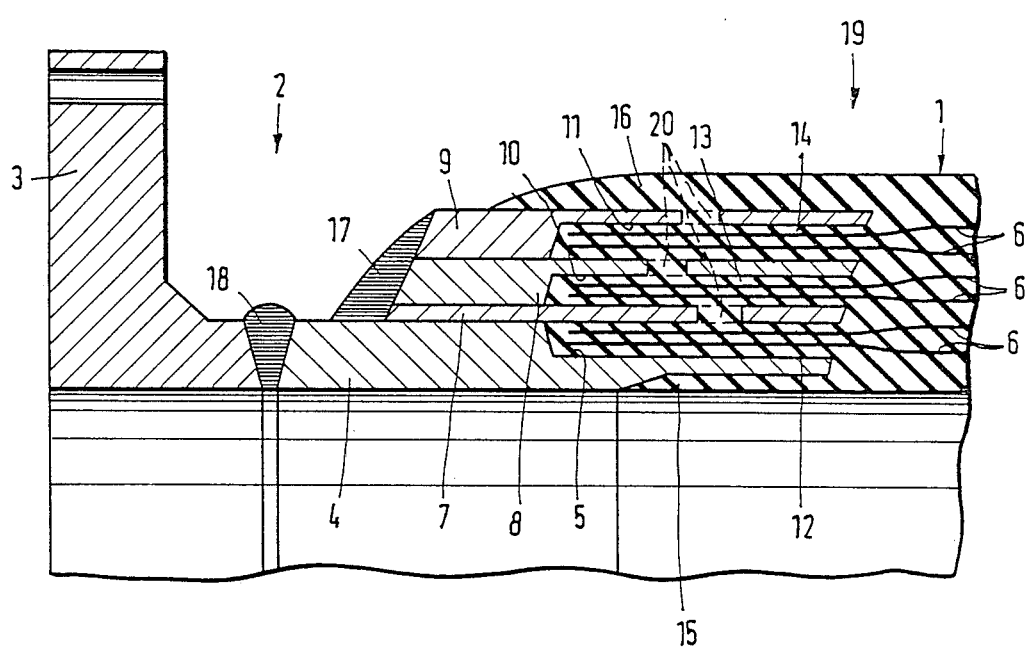

FITTING FOR HOSE PIPES

This is a continuation of application Ser. No. 519,227, filed Aug. 2, 1983 and now abandoned.

FIELD OF THE INVENTION

The invention relates to a hose fitting for connecting the end of a hose to other pipe systems, for connecting two pipe ends together or for closing a hose end, particularly for use with high-pressure hoses and/or hoses with a large diameter with, incorporated into the hose material, reinforcing layers consisting in a metal nipple, to which, each reinforcing layer is individually fixed and which, is connected seal-tight and firmly with the internal and covering layers of the hose.

BACKGROUND

For example, in the progressively developing field of oil drilling in off-shore locations the demands made on flexible hoses for the transport of petroleum and natural gas, in particular, are increasing, ever higher working pressures and greater diameters being demanded. In such hose systems, and with such demands, the connection technology is critical.

It is already known to provide the connection nipples made of metal which, in the area connected with the hose end, are designed in the manner of sleeves, with a series of steps, whereby for each reinforcement layer of the hose construction a special step is provided, to which the corresponding reinforcement layer is secured. The areas of application of the individual reinforcement layers onto the adhering surface of the metal nipple are, in this arrangement, staggered one from the other in the axial direction. In the majority of cases this leads to a transmission of force between nipples and reinforcement layers which varies from layer to layer, so that in the transitional area from hose to nipple there prevails an irregular distribution of tension in the individual layers. With the irregular distribution of tension in the reinforcement layers there is associated a reduction of the internal resistance to pressure. In addition, the constructional length of the nipples is relatively great, which is a drawback particularly with high pressure hoses having great nominal widths. Great design lengths of the metal nipples constitute a highly rigid portion of the ducting system as a result of which the handling of the hose system can be adversely affected.

SUMMARY OF INVENTION

The invention has for its object to design further a hose fitting of the type first defined hereinabove in such a manner that the solidity of the hose construction in the fitting area is not weakened, and in particular the internal pressure resistance is not lowered, whereby at the same time it is possible to work towards a section of ducting which is as rigid and as short as possible.

According to the invention this problem is solved in that the nipple has a plurality of concentric shells which are firmly connected with the nipple and are disposed in radial direction at a distance one from the other so that radial clearances between adjoining shells are produced, in that the fixing ends of the reinforcement layers are disposed in the clearances between the shells, and in that each individual reinforcement layer is fixed to at least one shell surface.

In the fitting according to the invention the individual reinforcement layers cover the metal nipple preferably along the same length and they are connected to the shells over this overall length. Thereby, all the reinforcement layers are stretched evenly over the crosssection, which effects an uniform and therefore high utilization of the filament reinforcement introduced. On the basis of the fact that the reinforcement layers protruding into the shells of the nipples are joined one on the other parallel with the nipple, the constructional length of the nipple is considerably reduced, so that a duct section provided with such a fitting has a relatively short rigid fitting portion. The flexibility of the hose pipe remains constant as a result.

The individual shells, to which the reinforcement layers of the hose material are fixed, may be constructed as sleeves.

Alternatively, the shells or some shells may be designed also as segments distributed over the circumference.

Preferably at least the innermost shell is designed as a sleeve, the shells lying above it being fixed to the sleeve.

Each reinforcement layer is suitably fixed to a surface of the shells. With this arrangement, therefore, two reinforcement layers can engage into a clearance between two shells, the inner reinforcement layer being fixed onto the external surface of the inner shell, and the outer reinforcement layer on the inner surface of the external shell. Alternatively, each reinforcement layer may be fixed also on two adjoining surfaces.

To fix the reinforcement layers on the shells, rubber-metal connections are suitable; they are produced simultaneously with the hose construction.

For the fixing of the reinforcement layers onto the shells, however, glueing connections are also provided, which also still make possible a subsequent connection of the nipple with a finished hose.

Finally, for the fixing between nipple and hose it is possible to provide also a positive and/or force-locking connection.

The individual shells are preferably provided with radially-extending through openings through which the rubber material can penetrate, as a result of which the intimate connection between nipple and hose material is further enhanced.

In the fitting according to the invention all shells have suitably a substantially similar axial length, so that in the area of the nipple and in the vicinity of the nipple there prevail the same conditions of tension in all reinforcement layers. The tensioning or setting of the reinforcement layers over the entire length of the nipple is thereby the same.

The production of the hose fitting may be effected in that the connection between the nipple and the shells is produced during the construction of the hose. In the area of the fitting, in the course of the manufacturing process, the individual reinforcement layers and metal shells of the nipple are laid one upon the other in alternate sequence and joined firmly together, and a connection of the shells one with the other is effected.

Alternatively, the connection of the nipple may also be effected on a finished hose. In this operation the metal shells are first of all joined with the nipple, and the hose profile is cut between the reinforcement layers. The metal shells are then inserted in the manner of a comb between the reinforcement layers of the hose, and glued with them, cast or joined with them in some other manner.

BRIEF DESCRIPTION OF THE DRAWING

The invention is represented on the drawing for the sake of example and is described in detail hereinunder on the basis of the drawing.

The sole FIGURE is a partial sectional view taken through a hose fitting according to the invention.

DETAILED DESCRIPTION OF A PREFERRED EMBODIMENT

The drawing shows a section through a hose end 1, which is connected with a metal nipple 2.

The metal nipple 2 consists of a flanged part 3 with which the hose end 1 is connected with another hose end or can be joined to any desired piping system. Onto the flanged part 3 an inner sleeve 4 is welded and has on its side turned towards the hose end 1 a stepped area 5 to take up two reinforcement layers 6.

Over the inner sleeve 4 a further shell 7 is arranged; it may be also constructed as a sleeve or assembled from several individual segments. To facilitate handling during the manufacturing process, shell 7 should be composed of two or three segments.

Radially outwards from the shell 7 a further two shells 8 and 9 join on, each provided with stepped portions 10 or 11. These stepped areas again serve to take up two reinforcement layers each.

The nipple represented in the drawing constitutes, with its inner sleeve 4 as well as shells 7, 8 and 9, three annular take-up spaces 12, 13 and 14, which are disposed exactly concentrically with each other. Of the two reinforcement layers 6 which engage in the relevant take-up space, the inner one is in each case fixed on the outside of the appropriate inner shell, and the outer one onto the inner surface of the outside shell.

The inner layer 15, made of rubber, of the hose covers in the fitting area the inside of the inner sleeve 4 wholly or partly. The outside covering layer 16 of the hose covers the outer side of the outer shell 9.

The connection of the individual reinforcement layers embedded into the rubber material of the hose with the shells of the nipple is effected via a rubber/metal connection between the rubber material surrounding the reinforcement layers and the individual surfaces of the nipple shells.

As may be seen from the sectional view, the shells of the nipple, which extend over a substantially similar length, engage in the manner of a comb into the hose material, the reinforcement layers lying in each case between the individual shells.

The ends of the shells 7, 8 and 9 facing the flanged part 3 are connected firmly and rigidly with the inner sleeve 4 at a welding point 17. The flanged portion 3 can finally be connected at a weld point 18 with the inner sleeve 4.

Instead of the welded connections 17 and 18 there may be provided also any other connections.

Also, the connection between the reinforcement layers and the individual shells of the nipple may be effected in any other suitable manner.

In the connection area between the reinforcement layers and the individual shells all reinforcement layers in the same axial section of the hose are connected over a substantially similar length with the metal nipple, as a result of which an optimally short design length is achieved. In the end area 19 of the nipple, in which the reinforcement layers go over into the hose material, there prevail the same states of tension in all layers so that a thorough utilization of the reinforcement layers can be achieved.

The hose fitting represented in the drawing was made at the same time as the manufacture of the hose. The manufacture is effected in that the shells and the rubber layers lying above them, and the reinforcement layers are applied in alternate sequence one after the other. The reinforcement layers are in this arrangement fixed in each case with a rubber/metal connection to the surface of the nipple associated with them.

The individual shells of the nipple may be provided with radial through openings 20 through which the nonvulcanized rubber can penetrate, as a result of which the intimate connection of the hose end 1 with the nipple is further improved.

When the fitting is not to be mounted onto the hose end till some later time, the hose end between the reinforcement layers is provided with annular cuts into which the nipple with its shells already mounted is inserted. Connection may be by glueing, casting or in some other manner. The cuts, into which the shells are subsequently inserted, may be also envisaged already at the hose manufacturing stage. In such a case, the corresponding shaping pieces are incorporated into the hose end; they are not joined with the reinforcement layers and are removed on final completion of the hose.

What is claimed is:

1. An assembly of a hose and fitting, comprising a flexible rubber hose having reinforcing layers completely embedded therewithin and spaced radially from one another such that the flexible hose includes a rubber outer covering layer and at least one rubber internal layer disposed between adjacent reinforcing layers, and a hose fitting attached to one end of the hose, said fitting defining a flow path having a longitudinal axis and including a metal nipple to which each separate reinforcing layer is fixedly joined and which is connected in a firm, fluid-tight manner with the internal and covering rubber layers of the hose, the nipple including a plurality of concentric shells which are firmly connected with one another and the nipple, each of said shells including annular portions extending parallel to said longitudinal axis and away from said nipple, said shells being spaced in a radial direction at a distance from one another so that radial clearances are obtained between adjoining shells, the ends of the reinforcing layers covered with rubber at the nipple extending into the radial clearances between the annular portions of the shells with each reinforcing layer being joined to the surface of at least one annular portion, and each of the reinforcing layers joined to the surface of at least one annular portion being fixed to said surface by vulcanization of the rubber, said firm and fluid-tight joining constituting connection means for securing said one end of the flexible hose to said nipple so that tension is generally equally distributed to said radially separated reinforcing layers along areas in which said reinforcing layers are joined to said nipple.

2. The assembly according to claim 1, wherein at least the radially innermost shell is a continuously annular sleeve and the shells surrounding said innermost shell are fixed thereto.

3. The assembly according to claim 2, wherein each reinforcing layer is joined to at least one shell surface.

4. The assembly according to claim 3, wherein each of the reinforcing layers is joined to the at least one shell surface via a locking connection.

5. The assembly according to claim 2, wherein the annular portions of the shells have radially extending openings through which the hose material extends to facilitate an intimate connection between the metal nipple and the hose material.

6. The assembly according to claim 2, wherein all the clearances between the annular portions of the shells have a substantially equal axial length.

7. The assembly according to claim 1, wherein each reinforcing layer is joined to at least one shell surface.

8. The assembly according to claim 7, wherein each of the reinforcing layers is joined to the at least one shell surface via a locking connection.

9. The assembly according to claim 1 wherein the annular portions of the shells have radially extending openings through which the hose material extends to facilitate an intimate connection between the metal nipple and the hose material.

10. The assembly according to claim 1 wherein all the clearances between the annular portions of the shells have a substantially equal axial length.

* * * * *